(No Model.)
H. E. MOOMAW.
CAR COUPLING.
No. 433,902. Patented Aug. 5, 1890.
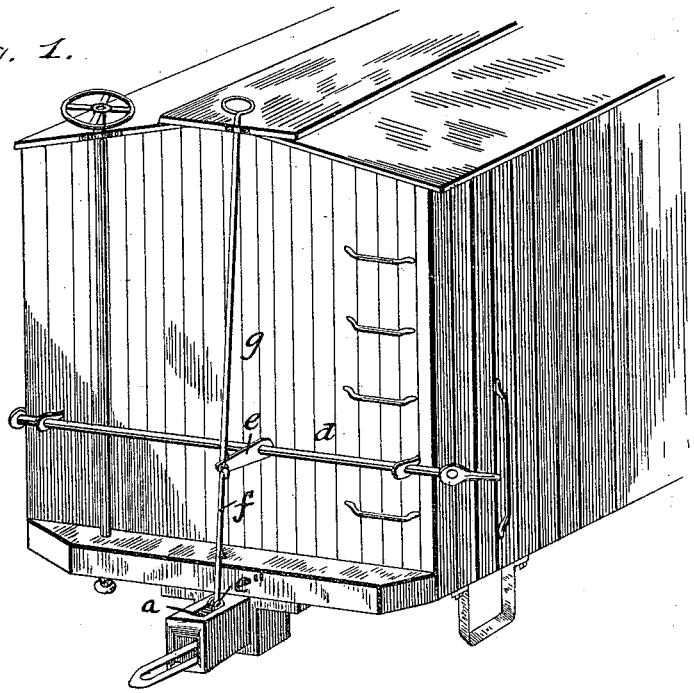
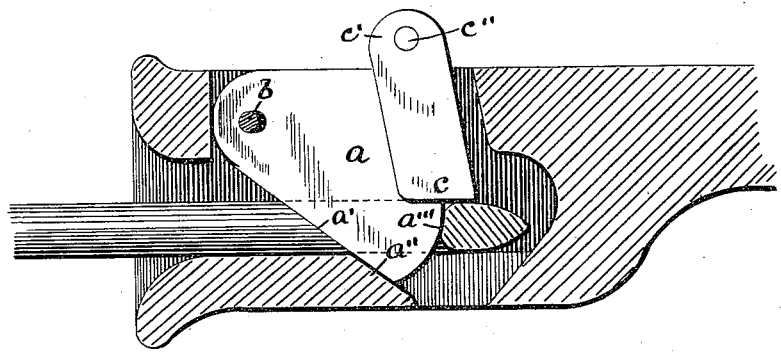
Witnesses:
F. C. Gibson
C. D. Davis
Inventor:
H. E. Moomaw
By his Attorney
C. M. Alexander

UNITED STATES PATENT OFFICE.

HENRY E. MOOMAW, OF CARYVILLE, FLORIDA, ASSIGNOR OF ONE-HALF TO E. T. HINOTE, OF SAME PLACE.

CAR-COUPLING.

SPECIFICATION forming part of Letters Patent No. 433,902, dated August 5, 1890.

Application filed April 24, 1890. Serial No. 349,321. (No model.)

*To all whom it may concern:*

Be it known that I, HENRY E. MOOMAW, a citizen of the United States, residing at Caryville, in the county of Washington and State of Florida, have invented certain new and useful Improvements in Automatic Car-Couplers, of which the following is a specification, reference being had therein to the accompanying drawings, in which—

Figure 1 represents a perspective view of one end of an ordinary box-car provided with my coupler, and Fig 2 a vertical longitudinal sectional view of the draw-head.

The invention has for its object the provision of improved and simple means for automatically coupling cars when they come together, as will fully hereinafter appear.

Referring to the drawings by letter, $a$ designates a plate or dog, of approximately triangular shape and working in a longitudinal slot in the top of the draw-head. The draw-head is practically of the ordinary shape, except that it is larger at the forward end than usual and is provided with a wider flaring mouth than the ordinary form. The dog $a$ has its forward rounded end pivoted to the upper part of the draw-head by a horizontal pin $b$, and its lower rearwardly-inclined edge $a'$ abuts against the forward inclined wall $a''$ of a recess in the bottom of the draw-head. Formed on the rear upper corner of the dog are two ears $c'$, connected by a bar $c''$, to which the operating-rod $f$ is connected. The rear edge of the dog is provided with a rearwardly-projecting shoulder $c$, which rests upon the link and holds it in a horizontal position, ready for entrance into the draw-head of the adjacent car. The lower portion of the rear edge of the dog is rounded off and inclined forwardly, as shown at $a'''$, in order that in uncoupling, the dog may be readily withdrawn from the link without slacking up the pull on the same; or, in other words, to enable the dog to be withdrawn from the link, whether the link be subjected to strain or not.

In operation it will be readily seen that the link as it enters the draw-head strikes against the forward inclined edge of the dog and automatically lifts the same and passes beyond it, whereupon the dog by its own weight drops down in the link and prevents its withdrawal, the shoulders $c$ keeping the link in a horizontal position. In this device I may use the ordinary coupling-link; but I prefer one having its ends beveled off and made more pointed, in order that it may enter the draw-head more readily. I may use, as is obvious, straight or bent links, according to the height of the respective cars. The pulling strain comes partly on the pin $b$ and partly on the draw-head, thereby making the device very strong and durable; but if it is desired to relieve the pin entirely, this may be done by enlarging the pin-hole in the dog horizontally, so that when the pull comes the forward end of the dog will bear against the draw-head instead of the pin, as is evident. The shoulder $c$ preferably extends around on the sides of the dog a short distance, in order that it will also rest upon the side bars of the link, thereby keeping the latter perfectly level and ready to enter the adjacent draw-head.

I may employ any suitable means to raise the dog in uncoupling; but I prefer the devices shown in Fig. 1, which consist of a rock-shaft $d$, journaled on the end of the car and provided at its ends (which extend to the sides of the car) with operating-handles. This shaft $d$ is also provided with an arm $e$, which is connected to the cross-bar $c''$ of the dog by means of a rod $f$. Connected to the arm $e$ and extending to the top of the car is a rod $g$. By these means the dog may be raised from either side or the top of the car.

Having thus fully described my invention, what I claim is—

The combination of a draw-head provided with an upper longitudinal slot, a pin $b$ across the forward end of the said slot, a dog $a$ in the said slot provided with a horizontal slot in its forward end, through which passes the pivotal pin $b$, the lower end of this dog resting against the front wall of a recess formed in the lower part of the draw-head and its rear side being provided with a shoulder $c$ to depress the rear end of the link, the portion of the dog below this shoulder against which the link bears being curved downwardly and forwardly, substantially as described.

In testimony whereof I affix my signature in presence of two witnesses.

HENRY E. MOOMAW.

Witnesses:
W. W. BLOODWORTH,
W. M. CHRISTMAN.